Oct. 4, 1955   C. L. C. CHAPMAN   2,719,874
ELECTRIC BATTERY
Filed Feb. 17, 1954
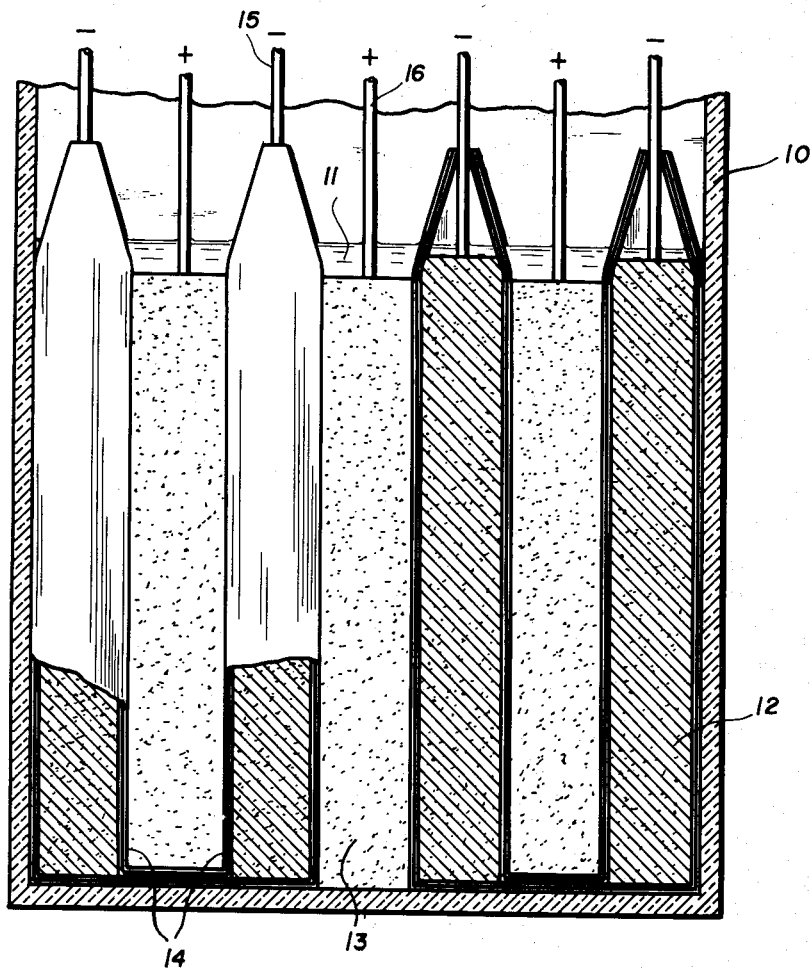
CHRISTOPHER L. C. CHAPMAN
INVENTOR.
BY  *Karl F. Ross*
AGENT

United States Patent Office 2,719,874
Patented Oct. 4, 1955

2,719,874

ELECTRIC BATTERY

Christopher Lionel Carter Chapman, Sutton, England, assignor to Yardney International Corp., New York, N. Y., a corporation of New York Application February 17, 1954, Serial No. 410,893

Claims priority, application Great Britain February 20, 1953

6 Claims. (Cl. 136—147)

This invention relates to electric batteries and is concerned more particularly with improvements in primary or rechargeable silver-zinc batteries of the kind disclosed, for example, in U. S. Patents No. 2,594,709, 2,594,710 and 2,594,711 owned by the assignee of the present application. In such batteries a diaphragm of semi-permeable material separating the electrochemically active electrode materials of opposite polarity is maintained under compression and is impregnated with an electrolyte comprising a solution of an alkali metal hydroxide at least substantially saturated with the negative electrode material, such as zinc.

In the above-mentioned patents it has been shown that a cell which is re-chargeable a large number of times may be formed by juxtaposing in a container a positive silver electrode and a negative zinc electrode separated by one or more layers of semi-permeable sheet material, for example, regenerated cellulose or cellophane, and so dimensioning the container that the sheet material, when caused to swell by the addition of an alkaline electrolyte, will not find room to satisfy completely its tendency to expand, thereby placing the assembly under a degree of compression such as to limit the size of the pores of the cellophane, or other semi-permeable sheet material, with the result that the migration of particles from one electrode to the other will be hindered and the risk of internal short circuits, so destructive of prior batteries of this general type, will be reduced.

The electrochemically active material of the negative electrode may be initially in the form of sheet zinc, compressed zinc oxide, or a paste of powdered zinc and electrolyte, and that of the positive electrode may be in the form of sheet silver, compressed silver, or powdered silver pasted with electrolyte.

The active materials may be finely divided and contained in bags or envelopes of the semi-permeable sheet material. Further, as disclosed in co-pending application Ser. No. 174,076, filed July 15, 1950, by Martin E. Kagan and Frank Solomon, a positive electrode which may be used in a battery of the kind described may consist in whole or in part of sintered silver; such electrode may comprise an element of solid metal and a mass of sintered silver combined to form a mechanical and galvanic unit with each other. An electrode in accordance with that co-pending application, while occupying less space than does a powdered electrode of the same weight, is more rugged and mechanically more stable than the latter and will not be subject to objectionable deformation or disintegration, even when made of very reduced thickness, either during handling and assembly into a battery, or when placed under pressure in a finished cell.

While presenting distinct advantages over prior-art constructions, silver-zinc batteries of the kind heretofore known nevertheless suffer from certain drawbacks.

Thus, the diffusion of the electrolyte adjacent the positive electrode is hindered by the presence of the semi-permeable membrane when it is wrapped about or envelops the positive active material, as is described in the specifications of the patent applications mentioned above. The diffusion of electrolyte is reduced proportionately to the number of layers of, and hence the thickness of, the semi-permeable sheet material. It is found that to produce a battery having a long life, a relatively large number of layers of the semi-permeable material is required, but the greater the number of layers the greater is the reduction in the diffusion of the electrolyte, and there is a practical limit to the extent to which diffusion can be reduced without seriously increasing the internal resistance of the battery and so reducing the efficiency of its performance.

The electrochemical processes of silver-zinc batteries are believed to lead to the production of particles of silver oxides of colloidal dimensions under certain circumstances of use. These particles tend to reduce the permeability of the semi-permeable membrane and so restrict further the diffusion of the electrolyte and increase the internal resistance of the cell. This in its turn leads to an increase in the rate of production of the colloidal silver oxide particles because the production of the colloidal particles takes place primarily in the last stage of charging when the battery shows a voltage of from 1.9 to 2.1 volts. At a given charging rate an increase in the internal resistance results in a higher voltage during the latter stages of charging and a consequent increase in the rate of production of the colloidal particles. It will be seen, therefore, that any reduction in the permeability of the semi-permeable membrane is to some extent cumulative in its effects.

Close confinement of the positive active material by enveloping it in the semi-permeable sheet material constituting the diaphragm also hinders the escape of gases which may, in certain circumstances, be produced on the surface of the positive active material, and polarization may result. Further, any products of the normal electrochemical reaction which may attack the material of the semi-permeable membrane are also closely confined by any wrapping or enveloping surrounding the positive active material and any such attack by such products is thereby aggravated.

As will be appreciated from what is written above, it is an advantage to keep within limits the internal resistance of the batteries. Therefore, when the positive active material is heavily enveloped by the semi-permeable material, it is common practice to limit the amount of wrapping surrounding the negative active material to an absolute minimum to keep within limits the internal resistance of the battery; indeed, in some cases the negative active material is not wrapped at all.

In such a case there is some physical loss of the negative active material due to disintegration and the phenomenon may be observed, during charging, of the deposition of grey accumulations of zinc adjacent to the edges of the negative electrode and in any part of the battery where there may be pockets of free electrolyte. This phenomenon is observed at voltage levels during charging which lie between 1.68 and 2.1 volts, the latter figure indicating the completion of charging. If over-charging takes place and the voltage of the cell is allowed to rise above 2.1 volts, the nature of the zinc deposits changes. Thus, bright metallic crystalline deposits appear, widely distributed throughout the battery, in place of the soft grey masses of zinc of localized distribution.

The soft grey masses partially disappear during the subsequent discharge, but any disappearance of the hard metallic coatings only takes place to a very small extent. In the case of the soft grey deposits, these tend to go back into solution but a proportion of them becomes detached and falls to the bottom of the case containing the battery and very often fails to take any further part in the normal electrochemical reactions. This precipitated material represents a definite loss of the negative active material. In the case of the hard metallic deposits, which are much less easily dissolved, these readily lead to the formation of short-circuit paths between the positive and negative electrodes. As a result, such batteries are sensitive to overcharging and it is in fact found in practice that when such batteries are overcharged in a number of consecutive cycles they will fail because of such short circuits.

The deposition of zinc, either as a soft grey mass or in the hard metallic form, is attributable to the following process. The satisfactory operation of silver/zinc accumulators of the kind described depends at least in part on the limitation of the quantity of free electrolyte so that in the early formation cycles the alkali metal hydroxide, e. g. potassium hydroxide, is converted to a saturated zinc solution according to the following reaction:

$$Ag_2O_2 + 2KOH + 2Zn \rightleftharpoons 2Ag + Zn(OK)_2 + H_2O + ZnO$$

which represents the characteristic reaction of what we may call the "soluble zinc" type of battery.

By limiting the amount of free electrolyte existing in any free space in the battery, the above reaction is substantially limited once saturation of the electrolyte with the zinc has taken place, this occurring after one or two cycles. The battery thereafter continues to operate according to the equations:

$$2AgO + H_2O + 2Zn \rightleftharpoons 2Ag + Zn(OH)_2 + ZnO$$
or
$$AgO + H_2O + Zn \rightleftharpoons Ag + Zn(OH)_2$$

It will be clear from these explanations that some of the energy put into the battery will result in the reaction expressed for the "soluble zinc" batteries owing to the presence of a certain amount of free electrolyte. This is confirmed by the fact that the phenomenon of zinc deposition is confined to pockets of free electrolyte and to those parts above the electrodes to which the semi-permeable diaphragm extends but where it is not under compression. In fact, the deposition referred to is a plating operation resulting from the electrolytic decomposition of the zinc-saturated electrolyte. Owing to the relatively small degree of protection in the form of wrapping of semi-permeable material around the negative active material, the outside of the wrapping is at substantially the cathodic potential, as is the active material itself, and accordingly the zinc deposition occurs outside as well as inside the wrapping of the zinc. The zinc deposited outside the wrapping frequently becomes detached and falls to the bottom of the cell where it may take no further part in the electrochemical reactions expressed. This may result in a reduction in the degree of saturation of the free electrolyte, leaving the eletcrolyte free to take further quantities of zinc into solution from the negative electrode.

Accordingly, there is a loss of negative active material due both to the physical factor of disintegration and the electrochemical factor of loss by electrolytic decomposition. This second cause of loss frequently acts to increase the rate of loss due to the first cause.

It will further be appreciated that loss of the negative active material will result in changes in the internal pressure of the battery and in reductions in the active surface area of the negative electrode. Secondary effects may, therefore, be produced, such as an increase in internal resistance and a reduction in the stability of the battery with possible damage of the semi-permeable membrane due to movement of the electrodes relative to one another.

It is an object of the present invention to provide a battery of the kind described wherein the defects referred to above shall be substantially reduced or even eliminated.

Accordingly, the present invention provides a battery of the kind described, characterized by the juxtaposition of a negative electrode comprising a semi-permeable envelope containing active electrode material, e. g. zinc, and a positive electrode comprising a self-supporting mass of active electrode material, e. g. silver, free from any wrapping.

The positive electrode may consist in whole or in part of sintered silver.

Preferably, the negative electrode comprises a semi-permeable envelope bent into U-shape and having two spaced-apart portions of the active electrode material disposed in respective arms of the U, the bight of the U being free from the active material and the positive electrode being enfolded by the arms of the U. Usually, the envelope of the negative electrode will comprise a plurality of plies of semi-permeable sheet material.

In a battery according to the invention the diffusion of the electrolyte around the positive electrode is substantially increased as compared with prior batteries in which the positive electrode is wrapped in semi-permeable sheet material, since in batteries in accordance with this invention the positive electrodes are at all times in direct contact with electrolyte. Further, the increased thickness of semi-permeable material enveloping the negative electrode will lead to a long life for the battery without the penalties due to reduced diffusion around the positive electrode being incurred.

Colloidal silver oxide particles are still produced, but are free to a certain extent to fall to the bottom of the battery casing out of harm's way, and silver oxide particles which do become attached to the outer layer of the wrapping of the negative electrode adjacent to the positive electrode remain in close contact with the electrolyte and the positive plate and are, therefore, readily and rapidly reduced to metallic silver. However, it has been observed that in batteries according to the present invention the production of silver oxide particles no longer takes place after a few cycles, and the loss of silver occasioned by those particles which do become detached and fall to the bottom of the casing represents so small a fraction of the total silver of the positive electrode as to have no appreciable effect on the behavior of the battery. Thus, there is no cumulative reduction in the diffusion of the electrolyte and the internal resistance of the battery remains substantially constant. In fact, the batteries have a lower internal resistance during the greater part of their discharge cycles than have the prior batteries because, while the diffusion of electrolyte around the positive electrode is very important, diffusion around the negative electrode can be restricted very considerably without affecting the performance of the battery.

In view of the absence of a semi-permeable envelope around the positive electrode any gassing of the positive electrode is unrestricted by wrappings and the gases can easily escape.

Accordingly, polarization is practically eliminated. Further, products of the electrochemical reaction which might attack the semi-permeable membrane are likewise less confined and the rate of any such attack on the membrane is, therefore, considerably reduced.

The physical loss of negative active material owing to disintegration is eliminated because of the close confinement of the negative electrode within its wrapping; this is particularly so in the case in which the negative electrode is of U-shape as referred to above. The deposition of metallic zinc, either in the soft grey form or as a hard metallic coating, is confined entirely to the negative electrode itself since only the latter is strongly cathodic in potential. The inner layers of the wrapping of the negative electrode, which might be expected to exhibit cathodic properties, are so closely enveloped by the outer layers of the wrapping that zinc deposition on the inner layer is negligible.

Not only is no negative active material lost from the negative electrode by physical disintegration, but there is also no such loss due to electrolyte decomposition of the zincate of the zinc-saturated electrolyte. This is because any zinc which may be precipitated or electrochemically deposited from the electrolyte, during charging, precipitates or is deposited on the negative electrode itself where it is able to take an active part in the electrochemical reaction. It is, of course, the case that some of the energy applied to the cell during charging still results in the electrochemical reaction common to the "soluble zinc" type of cells; this energy, however, does not produce the plating or deposition effects at random throughout the battery but only in the negative electrode where subsequently the energy released by the reverse process combines with the main electrochemical reaction to provide capacity for release during the subsequent discharging. It is commonly understood that any secondary cell which comprises some soluble component is capable of appreciably higher rates of discarge than are cells in which the active materials of both positive and negative electrodes are substantially insoluble.

Tests have in fact confirmed that batteries according to the present invention are indeed capable of appreciably higher rates of discharge than batteries in which both the positive and negative active materials are completely insoluble.

The batteries according to the present invention have the further advantage that since no disintegration of the negative electrode takes place, the stability of the battery remains high and the active surface area remains unchanged. Further, the absence of any such disintegration means that there is no appreciable relative movement of the electrodes such as might lead to damage of the semipermeable membrane.

Another important advantage of batteries according to the present invention is that they are relatively insensitive to overcharging or indeed almost completely immune from damage due to overcharging. Tests have shown that a given battery according to the invention can be overcharged to the extent of 300% with the complete decomposition of water from the electrolyte, without damage; replacement of the water lost restores the battery to normal. Prior batteries would have been rendered useless by such overcharging.

Tests have also shown that with a test cycle employing very high rates of charge and discharge the prior batteries become short-circuited after 8 cycles while the corresponding battery in accordance with the present invention showed no short-circuiting effects after 100 such cycles.

An additional advantage of batteries according to the present invention resides in their clean appearance as compared with the dirty appearance of prior batteries of the kind described due to zinc deposition, which dirty appearance, suggesting some equivalent condition to the sulphation experienced in acid batteries, tended to alarm the user.

So that the present invention may be better understood the following specific description of one embodiment thereof is given by way of example, with reference to the accompanying drawing showing, partly in section, an electrode assembly according to the invention.

The battery comprises a rigid casing 10 containing an electrolyte 11 and negative electrodes 12 alternating with positive electrodes 13. Some of the positive electrodes are flanked by the two arms of a U-shaped negative-electrode assembly, the bight of which is free from active material. Each positive electrode is separated from each adjacent negative electrode by sheet material 14 constituted by a plurality of layers of semipermeable material, such as cellophane; this sheet material may also include one or more layers and each of relatively high permeability, e. g. of porous paper, as disclosed in U. S. Patent No. 2,610,219 owned by the assignee of this application. The multi-layer separator is wrapped simultaneously around pairs of negative electrodes 12 so as to form several U-shaped assemblies. The positive electrodes 13 are thus disposed between either the arms of one assembly or adjacent arms of different assemblies. Positive leads 16 project from the unwrapped positive electrodes 13 while negative leads 15 project from the envelopes 14 surrounding the negative electrodes 12.

In making a battery as described above, two negative electrodes 12, each of which may be individually wrapped in a single layer of porous paper, are disposed in spaced-apart relation upon a rectangular strip of cellophane which is wider than the combined length of the two negative electrodes to a degree sufficient to provide at least .5 cm. overlap at the outer ends, but which may be wider to a greater degree than quoted above to allow any desired amount of overlaps. The strip is then wrapped around the electrode portion a number of times (preferably more than six times) to form an open-ended packet in which the negative electrode portions are enclosed by a plurality of thicknesses of the cellophane 14.

The negative leads 15 project through the outer ends of the packet. The packet containing the negative electrodes 12 is then bent into U-shape to form a negative assembly which envelops an unwrapped positive electrode 13. It will be appreciated that in binding the negative-electrode assembly into U-shape the bight or center portion of the U contains no electrode material, the latter being folded at a point between the negative electrodes 12 located in the two arms thereof. One or more such assemblies and the necessary number of positive plates are then introduced into the suitably dimensioned casing 10, which is subsequently filled with electrolyte 11, thereby causing the cellophane to swell and to place the unit within the casing under compression.

I claim:

1. In an electric battery, in combination, a casing, an electrolyte in said casing, at least one positive and at least two negative electrodes in said electrolyte, and semi-permeable sheet means between said electrodes, said sheet means enveloping said negative electrodes but leaving said positive electrode unwrapped and freely accessible to said electrolyte, said negative electrodes and sheet means together constituting a U-shaped assembly containing said negative electrodes in respective arms of the U, said arms embracing said positive electrode.

2. In an electric battery, in combination, a casing, an alkaline electrolyte in said casing, at least one positive and at least two negative electrodes in said electrolyte, and semi-permeable sheet means between said electrodes, said sheet means enveloping said negative electrodes but leaving said positive electrode unwrapped and freely accessible to said electrolyte, said negative electrodes and sheet means together constituting a U-shaped assembly containing said negative electrodes in respective arms of the U, said arms embracing said positive electrode.

3. In an electric battery, in combination, a casing, an alkaline electrolyte in said casing, at least one positive and at least two negative electrodes in said electrolyte, said negative electrodes containing zinc, said positive electrode containing a metal more electropositive than zinc, and semi-permeable sheet means between said electrodes, said sheet means enveloping said negative electrodes but leaving said positive electrode unwrapped and freely accessible to said electrolyte, said negative electrodes and sheet means together constituting a U-shaped assembly containing said negative electrodes in respective arms of the U, said arms embracing said positive electrode.

4. In an electric battery, in combination, a casing, an alkaline electrolyte in said casing, at least one positive and at least two negative electrodes in said electrolyte, said positive and negative electrodes containing silver and zinc, respectively, and semi-permeable sheet means between said electrodes, said sheet means enveloping said negative electrodes but leaving said positive electrode unwrapped and freely accessible to said electrolyte, said negative electrodes and sheet means together constituting a U-shaped assembly containing said negative electrodes in respective arms of the U, said arms embracing said positive electrode.

5. In an electric battery, in combination, a casing, an alkaline electrolyte in said casing, at least one positive and at least two negative electrodes in said electrolyte, and semi-permeable sheet means between said electrodes, said sheet means enveloping said negative electrodes but leaving said positive electrode unwrapped and freely accessible to said electrolyte, said negative electrodes and sheet means together constituting a U-shaped assembly containing said negative electrodes in respective arms of the U, said arms embracing said positive electrode, said electrodes and sheet means being held under pressure in said casing.

6. In an electric battery, in combination, a casing, an alkaline electrolyte in said casing, at least one positive and at least two negative electrodes in said electrolyte, said positive and negative electrodes containing silver and zinc, respectively, and semi-permeable sheet means between said electrodes, said sheet means enveloping said negative electrodes but leaving said positive electrode unwrappd and freely accessible to said electrolyte, said negative electrodes and sheet means together constituting a U-shaped assembly containing said negative electrodes in respective arms of the U, said arms embracing said positive electrode, said electrodes and sheet means being held under pressure in said casing.

References Cited in the file of this patent
UNITED STATES PATENTS
2,317,711    Andre _____ Apr. 27, 1943